US007967535B2

(12) United States Patent
Eiserer et al.

(10) Patent No.: US 7,967,535 B2
(45) Date of Patent: Jun. 28, 2011

(54) HOLE SAW WITH WASTE PLUG EJECTOR

(76) Inventors: Cecil Eiserer, Carrollton, MO (US);
David Brunscher, Bogard, MO (US)

( * ) Notice: Subject to any disclaimer, the term of this patent is extended or adjusted under 35 U.S.C. 154(b) by 524 days.

(21) Appl. No.: 12/229,091

(22) Filed: Aug. 20, 2008

(65) Prior Publication Data
US 2010/0047030 A1    Feb. 25, 2010

(51) Int. Cl.
*B23B 51/04* (2006.01)
(52) U.S. Cl. .......................... 408/204; 408/68
(58) Field of Classification Search .............. 408/67–68, 408/204–209, 703; *B23B 51/04, 51/05*
See application file for complete search history.

(56) References Cited

U.S. PATENT DOCUMENTS

| 983,810 | A | * | 2/1911 | Crossley ................... 408/68 |
| 1,234,467 | A | | 7/1917 | Hamilton |
| 1,365,660 | A | | 1/1921 | Collier |
| 1,988,538 | A | * | 1/1935 | Brown ................... 408/96 |
| 3,265,104 | A | | 8/1966 | Gallo, Sr. |
| 3,390,596 | A | | 7/1968 | Trevathan |
| 3,648,508 | A | | 3/1972 | Hougen |
| 4,652,185 | A | | 3/1987 | Malrick |
| 4,755,087 | A | | 7/1988 | Parent |
| 5,082,403 | A | | 1/1992 | Sutton et al. |
| 5,435,672 | A | | 7/1995 | Hall et al. |
| 5,690,452 | A | | 11/1997 | Baublits |
| 5,791,837 | A | * | 8/1998 | Johnson ................... 408/204 |
| 5,816,752 | A | | 10/1998 | Benjamin |
| 5,934,845 | A | | 8/1999 | Frey |
| 6,341,925 | B1 | | 1/2002 | Despres |
| 7,001,116 | B2 | | 2/2006 | Kozak |
| D529,525 | S | | 10/2006 | Waldron et al. |
| 7,160,064 | B2 | | 1/2007 | Jasso |

FOREIGN PATENT DOCUMENTS

| AU | 234301 | | 6/1961 |
| EP | 1356883 A1 | * | 10/2003 |
| FR | 2694719 A1 | * | 2/1994 |
| JP | 05318217 A | * | 12/1993 |
| JP | 2003145330 A | * | 5/2003 |
| JP | 2005144568 A | * | 6/2005 |
| JP | 2006026801 A | * | 2/2006 |

* cited by examiner

*Primary Examiner* — Daniel W Howell
(74) *Attorney, Agent, or Firm* — John C. McMahon

(57) ABSTRACT

A hole saw having a tubular cutting portion, a pilot drill bit, an ejection plate disposed within the tubular cutting portion and a compression spring cooperating with the plate further includes a guide structure fixed to the ejection plate and slidingly cooperating with a helical flute of the pilot drill bit. The compression spring and cooperating guide structure provide a combination of linear and rotational ejection of a waste plug from the hole saw. A duel set screw feature facilitates waste plug removal if needed and includes a first set screw frictionally engaged with a flat surface of the drill bit and a second set screw cooperating with a circular groove running about the drill bit.

14 Claims, 2 Drawing Sheets

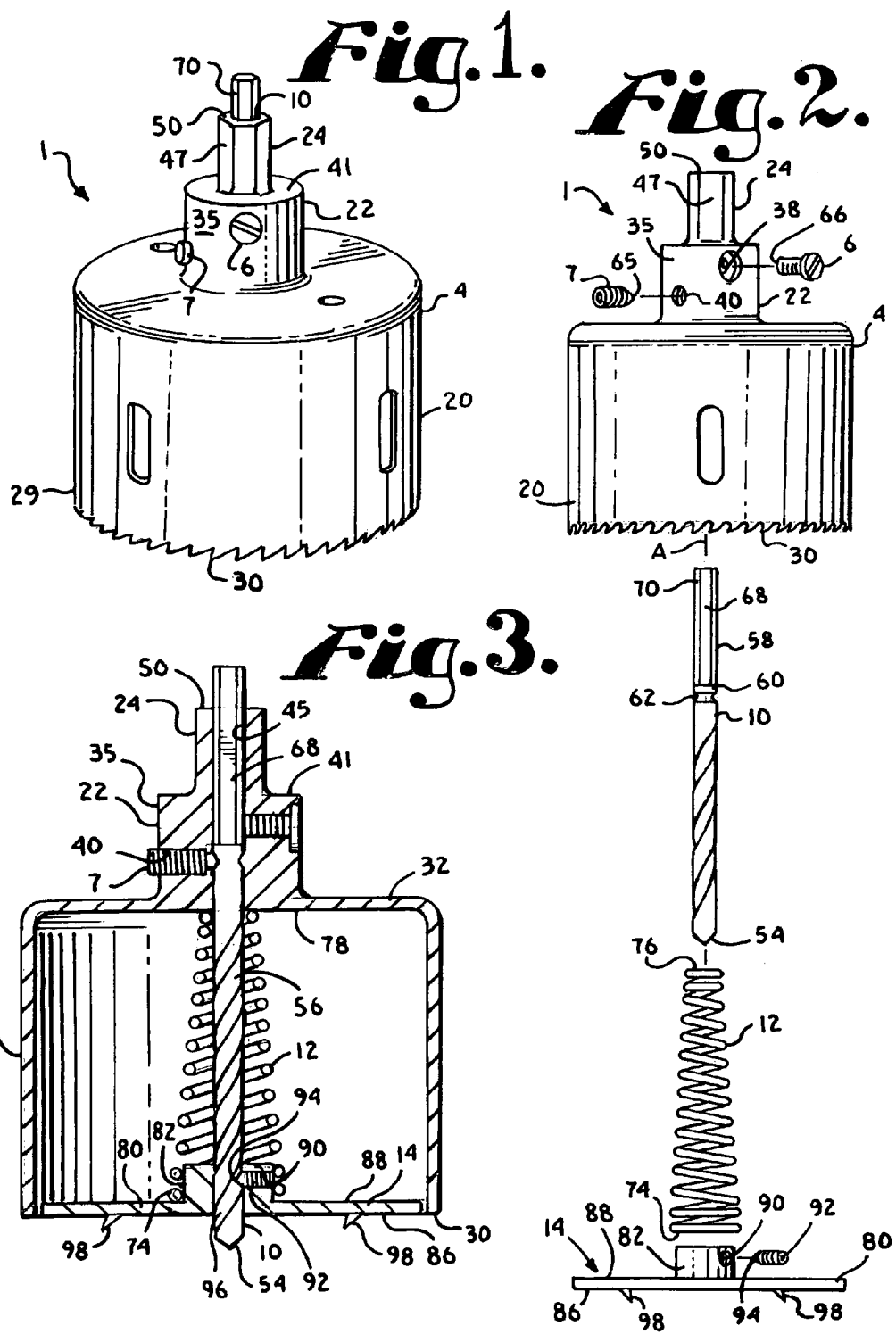

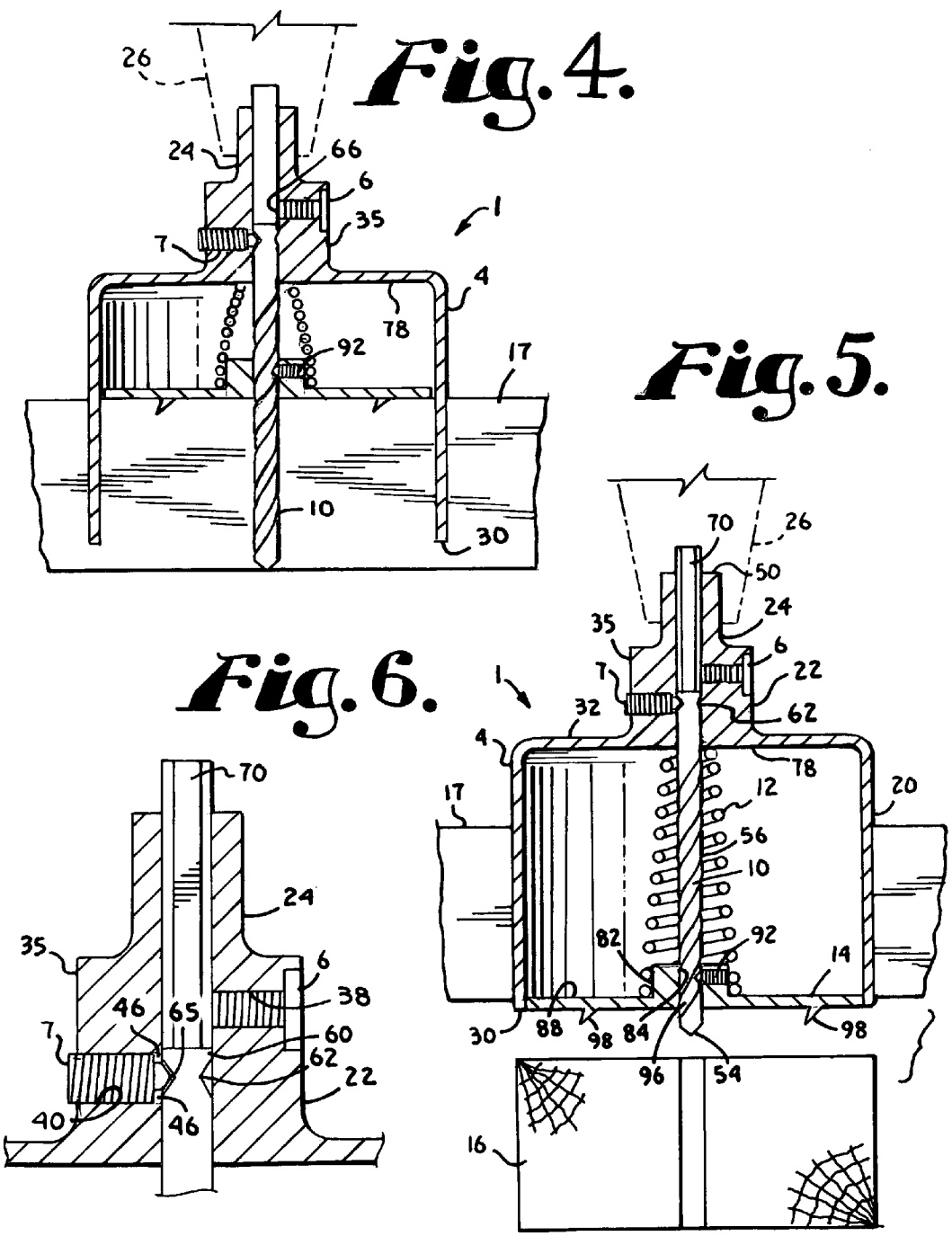

HOLE SAW WITH WASTE PLUG EJECTOR

BACKGROUND OF THE INVENTION

The present invention is directed to hole saws that have a waste plug or slug removal apparatus.

Hole saws are useful for cutting circular holes in a variety of materials, including, but not limited to wood, metal, plastics and dry wall. Hole saws are typically in the form of a hollow cylinder or tube having a circular edge with cutting teeth at one end and structure for attachment to a power drill or other type of drilling machine at the other end thereof. Typically, hole saws are sized and shaped to cooperate with the bit of a drill such that the cutting edge and possibly a portion of the flute of the bit extend in a direction forward of the circular cutting teeth of the saw to provide a center guide or pilot for placement of the hole in a desired location on a piece of material. In the art, the term "drill" may be used to describe a drilling machine or a drill bit for use in a drilling machine. Therefore, in this application, for the sake of clarity, the term "drill bit" or "bit" is used throughout to refer to a bit for use in a drilling machine, and "drill" always refers to a drilling machine, such as a power drill.

As a pilot drill bit and cooperating hole saw rotate, a desired hole is cut in a piece of material, leaving an unwanted or waste plug of the material located within the cylindrical wall of the tubular hole saw. Various structure and mechanisms have been devised to remove or allow for easy removal of the plug formed within the hole saw. For example, some hole saws include radially inwardly and outwardly directed teeth to provide adequate space or clearance to allow for the plug to drop out of the hole saw after sawing of the hole. However, plugs often get stuck within the saw and knock-out devices have been devised that eject such plugs after a hole is completed. Some knock-out devices have included a plate or other structure cooperating with a spring located within the tubular body of a hole saw. Such plates or other structures include a central aperture for completely clearing the pilot drill bit. As the hole saw is used, the knock-out plate or other structure is pushed against the spring by the plug of material being formed during the hole sawing process, moving the knock-out plate away from the cutting teeth and compressing the spring. When the hole is completed and the saw's rotation is stopped, the spring decompresses and pushes the knock-out plate against the waste plug, pressing the plug in a linear direction along the central axis of the hole saw and toward the cutting teeth and ultimately out the end of the saw. Particles and dust from the sawing of the hole however, may slow, hinder or even stop such linear movement of the waste plug out of the hole saw. One known prior art mechanism includes a knock-out plate retained within a hole saw by screws that extend radially outwardly through clean-out slots located on the cylindrical wall of the saw. The screws also attach to an external ring that may be grasped and forced along the curved clean-out slot path at the outer surface of the saw, thus pushing the knock-out plate and the waste plug toward the cutting teeth and out of the saw. A compression spring located within the hole saw aids in positioning and ejecting of the waste plug.

SUMMARY OF THE INVENTION

A hole saw of the present invention includes a pilot drill and a waste plug removal device. The saw is cylindrical with cutting teeth at one end and a circular base at an opposite end thereof, the base being integral or otherwise fixed to a shank for attachment to a power drill. The shank includes a through-bore for receiving and holding the pilot drill bit. The pilot drill bit is located coaxially within a bore formed by the saw. A substantially flat, circular plunger is located in the bore, the plunger including an aperture for receiving the drill bit and having a plunger guide or nub that closely follows a helical path of the pilot drill bit. In one embodiment, the plunger further includes small sharp, angled projections or nibs for engaging the waste plug. A spring is located between the plunger and the circular base of the hole saw.

Furthermore, in one embodiment, the saw further includes a dual set screw attachment mechanism wherein the pilot drill bit includes a guide groove surrounding the pilot drill bit for cooperating with a first set screw and one or more flat surfaces for cooperating with a second set screw to fix the bit to the shank. The first set screw engages the guide groove, attaching the drill bit to the saw, but allowing relative rotation of the bit with respect to the saw while the second or main set screw fixes the drill bit to the saw with respect to rotation.

In operation, as the hole saw is used, the waste plug pushes the plunger toward the circular base, the nibs engage the plug, and the spring is compressed. When sawing is completed, the spring pushes the plunger forward toward the saw teeth, the waste plug being pushed and rotated out of the saw by the rotating plunger. If the plug remains stuck in the saw, the operator may loosen the main set screw, rotationally disengaging the saw from the drill bit. The cylindrical saw housing and bit may then be rotated independently to aid in slug removal, without removing the bit from the saw.

OBJECTS AND ADVANTAGES OF THE INVENTION

An object of the invention is to provide a waste plug removal device for cooperation with a hole saw. It is a further object of the invention to provide a hole saw and waste plug removal device that automatically ejects a waste plug from the saw. It is another object of the invention to provide a waste plug removal device for a hole saw that cooperates with a pilot drill bit to automatically eject a waste plug from the saw. It is another object of the invention is to provide a waste plug removal device for a hole saw that cooperates with a pilot drill bit to manually eject a waste plug from the saw if automatic ejection does not occur. Furthermore, it is an object of the invention to provide apparatus and methods that are easy to use and especially adapted for the intended use thereof and wherein the apparatus are comparatively inexpensive to make and suitable for use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a hole saw according to the invention.

FIG. 2 is a reduced and exploded front elevational view of the hole saw of FIG. 1.

FIG. 3 is an enlarged front elevational view of the hole saw of FIG. 1 with portions removed to show the detail thereof.

FIG. 4 is a reduced front elevational view with portions removed, similar to FIG. 3, showing the hole saw of FIG. 1 with a piece of material during cutting thereof and formation of the waste plug.

FIG. 5 is a front elevational view with portions removed, similar to FIG. 4, showing the hole saw of FIG. 1 after ejection of the waste plug.

FIG. 6 is an enlarged and partial front elevational view of the hole saw as shown in FIG. 5 with portions broken away to show the detail thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. It is also noted that any reference to the words top, bottom, up and down, and the like, in this application refers to the alignment shown in the various drawings, as well as the normal connotations applied to such devices, and is not intended to restrict positioning of structures of the application in actual use.

With reference to FIGS. 1-5, the reference numeral 1 generally designates a hole saw according to the invention including a housing 4 with cooperating set screws 6 and 7; a pilot drill bit 10; a compression spring 12; and a plunger 14 for ejecting a waste plug 16 of a material 17 being cut by the hole saw 1. The housing 4, pilot drill bit 10, compression spring 12 and plunger 14 are all coaxial along a central axis A. The housing 4 includes a substantially cylindrical, tubular cutting portion 20, an integral cylindrical drill bit connector portion 22 and an integral shank 24 through which the drill bit 10 may extend for cooperation with a power drill 26 (shown in phantom). The portions 20, 22 and 24 are all coaxial along the axis A. It is noted that in some embodiments of the invention, the connector portion 22 may be omitted or be the same diameter and thus part of the shank portion 24, or in smaller saws, the portion 22 may be an extension of the portion 20 and thus have the same or similar diameter as the portion 20. Further, one set screw 6 may extend through the shank 24 and the other set screw 7 through the connector portion 22, for example, in various embodiments according to the invention. For smaller or larger hole saws, the connector portion 22 and shank 24 may each be sized smaller or larger accordingly to adequately and securely attach the hole saw and drill bit 10 to the drill 26.

The cutting portion 20 includes a cylindrical wall 29 having a circular cross-section with an outer diameter approximately the same size as a diameter of a desired circular hole to be cut in the material 17. The cutting portion 20 includes a substantially circular forward or bottom edge at one end of the cylindrical wall 29 having cutting teeth 30 there-along for rotational cutting of the hole in the material 17. The cutting teeth 30 may be any of a variety of teeth or serrations known in the art for use on hole saws. At an opposite end of the cylindrical wall 29, a substantially planar, annular plate 32 is integral or otherwise fixed to the wall 29 of the tubular cutting portion 20. Formed in the plate 32 along the axis A is a central circular hole or bore 34 sized and shaped for receiving the drill bit 10 therethrough. The drill bit connector portion 22 is integral or otherwise fixed to the plate 32 and includes a substantially cylindrical wall 35 having a first threaded aperture or through bore 38 for receiving and threadably mating with the set screw 6 and a second threaded aperture or through bore 40 for receiving and threadably mating with the smaller set screw 7. Each of the apertures 38 and 40 extend through the wall 35 in a radial direction with respect to the axis A. In the illustrated embodiment, the aperture 40 is spaced from the aperture 38 along the axis A with the aperture 40 located near the plate 32 and the aperture 38 located near an annular end surface 41 of the connector portion 22 that is adjacent the shank 24. As illustrated in the drawing figures, the set screws 6 and 7 are each sized and shaped to mate with and extend through the wall 35, to extend into a bore 45 formed in the connector portion 22 and the shank 24 along the axis A, and engage the drill bit 10 as will be described in greater detail below. The shank 24 is integral or otherwise fixed to the connector portion 22 at the end 41. The central bore 45 that runs through both the shank 24 and the connector portion 22 is sized and shaped for closely receiving the drill bit 10. At the threaded bore 40 and adjacent to the central bore 45, the walls forming the bore 40 include an annular and radially inwardly directed abutment shelf or seat 46 that engages the set screw 7 and limits movement of the screw 7 toward the axis A as will be described in greater detail below.

The shank 24 includes a faceted outer surface 47, illustrated as hexagonal in cross-section perpendicular to the axis A, for secure frictional mating engagement with a chuck of the power drill 26. The shank 24 further includes an end surface 50 through which the drill bit 10 is shown extending in FIG. 1.

The drill bit 10 includes a cutting edge 54, a fluted cutting body 56 integral with an upper shank portion 58. Near the fluted cutting body 56, the upper shank portion 58 has a cylindrical surface 60 onto which a circular groove 62 is formed. The groove 62 is sized and shaped to slidingly receive a pointed end 65 of the smaller set screw 7. With particular reference to FIG. 6, and as described above, the screw 7 abuts against the seat 45 formed by the connector portion 22 and thus preventing the pointed end 65 of the screw 7 from being in fixed frictional engagement with the pilot drill bit 10. Spaced from the groove 62, the shank portion 58 becomes faceted, having flat surfaces 68 (shown for example, as hexagonal in cross-section), the surfaces 68 sized and shaped for secure frictional engagement with the set screw 6 at a planar abutment end 66 thereof. The shank portion 58 is sized and shaped to be closely but freely received within the bore 34 and the bore 45 and include an end portion 70 extending beyond the end surface 50 of the shank 24 an amount adequate for cooperating with the drill 26 if necessary.

The illustrated compression spring 12 is helical and generally conical in form having a larger diameter at a first or forward end 74 and a relatively smaller diameter at a second or rearward end 76. The forward end 74 is sized to surround a portion of the plunger 14 as will be described in greater detail below. The smaller or rearward end 76 is sized and shaped to slidingly fit about the drill bit 10 and to abut against an inner surface 78 of the annular plate 32. Although a spring of constant diameter may be utilized according to the invention, the conical spring 12 advantageously cooperates with both the drill bit 10 and the plunger 14, keeping the spring 12 aligned along the axis A without the need for additional set screws, pins or other fixing structure to attach the spring 12 to the hole saw 1 as well as keep the spring 12 aligned evenly about the axis A along an entire axial length of the spring 12 from the surface 78 to the plunger 14.

The plunger 14 includes a flat, circular plate 80 and an inner cylindrical support 82 that is integral or otherwise fixed to the plate 80. A through bore 84 is formed centrally through the plate 80 and support 82 along the axis A. The bore 84 is sized and shaped to clear and freely receive the drill bit 10 at the fluted body 56 with the drill bit cutting edge 54 extending external of the plunger 14 beyond an outer surface 86 of the plate 80. The spring 12 larger end 74 is disposed about the support 82 and abuts against an inner surface 88 of the plate 80. Formed in the support 82 is a threaded through bore 90 sized and shaped to threadably mate with a threaded guide pin or nub 92 having a rounded end 94 sized and shaped for slidingly mating and following along a curved path or depression 96 formed in and by the fluted body 56 of the drill bit 10.

The illustrated plunger 14 further includes at least one and up to a plurality of spaced gripping projections or nibs 98 extending away from the exterior surface 86 and outwardly from forward of the plunger 14. The projections 98 may be integral or fixed to the plate surface 86 and are preferably angled to grip or grab onto the waste plug 16 during rotational ejection of the plug 16 from the saw 1 as will be described in greater detail below.

With particular reference to FIGS. 2 and 3, the hole saw 1 is assembled by inserting the spring 12 about the drill bit 10 with the smaller end 76 of the spring facing toward the end portion 70 of the bit 10. Before or after insertion of the spring 12 on the drill bit 10, the bit driving and cutting edge 54 is inserted into the bore 84 of the support 82 of the plunger 14 until the cutting edge 54 extends beyond the outer surface or exterior 86 of the plunger 14. The set screw 92 is then inserted and rotated in the bore 90 until the set screw tip 94 enters the path 96 of the fluted body 56 of the drill bit 10. The screw 92 is set within the bore 90 such that the tip 94 slidingly mates with the fluted body 56, allowing the plunger 14 to rotate with respect to the drill bit 10 along the helical path 96. The drill bit 10 and cooperating plunger 14 are then inserted into the hole saw housing 4 with the drill bit shank portion 58 being inserted into the bore 34, the bore 45 and out the shank top 50 as shown for example in FIG. 3. The set screw 7 is inserted in the threaded bore 40 and rotated until the screw 7 abuts against the shelf 46 and the point 65 is in sliding engagement with the drill bit 10, allowing the bit 10 to rotate about the axis A independent of the tubular cutting portion 20 of the hole saw housing 4. When the set screw 7 is slidingly engaged with the groove 62 of the pilot drill bit 10, the plunger plate 80 is disposed within the tubular cutting portion 20 with the spring 12 in a substantially decompressed or neutral position, the spring portion 74 disposed about the plate support 82 and the spring end 76 disposed about the drill bit 10 and abutting against the surface 78 of the annular plate 32.

Also with respect to FIG. 3, the set screw 6 is inserted into the threaded bore 38 and rotated until the flat tip 66 abuts against and frictionally engages with one of the flat faces 68 of the drill bit 10. Once the set screw 6 is frictionally engaged with one of the flat surfaces 68 of the drill bit shank 58, the drill bit 10 is in a pilot guide and cutting position wherein the drill bit 10 is locked with respect to the cutting portion 20 and thus rotatable about the axis A in concert with the cutting portion 20 when the hole saw shank 24 is engaged with the power drill 26.

In operation, the hole saw 1 as illustrated in FIG. 3 is then attached to a power drill 26 at the shank 24 as shown in FIGS. 4 and 5 and positioned in a desired location on the material 17 being cut, with the pilot drill bit 10 cutting edge 54 initially drilling into the material 17, followed by the rotating cutting teeth 30. As the saw 1 rotates and cuts into the material 17, the plunger 14 pushes against the spring 12, compressing the spring 12 and is pushed into the tubular saw housing 4 by the waste plug 16 being formed by the action of the cutting teeth 30. As illustrated in FIG. 5, once the teeth 30 cut completely through the material 17 and rotation of the saw teeth 30 and drill bit 10 is stopped, decompression of the spring 12 pushes the plunger 14 and the waste plug 16 in a direction toward the teeth 30 and out of the saw cutting portion 20. As the plunger 14 is pushed by decompression of the spring 12, the plunger 14 is also rotated about the drill bit 10 by action of the guide pin 92 following the helical path 96 of the fluted portion 56 of the drill bit 10. Also, as the plunger 14 rotates, the projections 98 grip the waste plug 16, aiding in rotation of the waste plug 16 along with the plunger 14 within the now stationary tubular cutting portion 20, further aiding in an automatic, rotational ejection of the plug 16 out of the saw 1.

The combination of linear and rotational movement of the plunger 14 advantageously provides adequate movement and clearing of dust and particles to guard against sticking or wedging of the plug 16 against the tubular cutting portion 20 in most situations. However, if a waste plug 16 gets tightly wedged within the portion 10, an operator may loosen the set screw 6, rotationally disengaging the drill bit 10 from the cutting portion 20 while maintaining the bit 10 within the cutting portion 20 with respect to the axis A due to the sliding cooperation between the drill bit 10 and the set screw 7. Then, the cutting portion 20 may be rotated with respect to the drill bit 10, either manually, or by attaching the end portion 70 of the drill bit 10 to the drill 26 and reversing rotation of the drill, forcing the plunger 14 toward the teeth 30 by action of the guide pin 92 along the helical path 96 of the drill bit 10.

It is to be understood that while certain forms of the present invention have been illustrated and described herein, it is not to be limited to the specific forms or arrangement of parts described and shown.

What is claimed and desired to be secured by Letters Patent is as follows:

1. In a hole saw having a tubular cutting portion, a pilot drill bit, an ejection plate disposed within the tubular cutting portion and a compression spring cooperating with the plate, the improvement comprising:
   a guide structure fixed to the ejection plate and slidingly cooperating with a helical flute of the pilot drill bit.

2. The improvement of claim 1 further comprising at least one gripping projection located on the ejection plate and directed outwardly from an exteriorly facing surface of the plate.

3. The improvement of claim 1 further comprising:
   a) a first set screw sized and shaped for abutting against a surface of the drill bit, the first set screw fixing the cutting portion with respect to the pilot drill bit for rotation of both the cutting portion and the drill bit about a central axis when the first set screw is frictionally engaged with the drill bit;
   b) a groove formed in the drill bit, the groove extending about the central axis; and
   c) a second set screw slidingly engageable with the groove, the second set screw fixing the pilot drill bit in an axial position with respect to the cutting portion when engaged with the groove, the second set screw allowing relative rotation of the drill bit with respect to the cutting portion when the first set screw is disengaged from the pilot drill bit.

4. The improvement of claim 1 further comprising:
   a) a cylindrical support fixed to the plate, the support having a through bore extending along the central axis, the through bore receiving the pilot drill bit; and wherein
   b) the guide structure comprises a guide pin extending radially from the support and directed toward the central axis, the guide pin in sliding contact with a helical path of the pilot drill bit.

5. The improvement of claim 4 wherein the cylindrical support includes a radially extending threaded aperture, the guide pin extending through the aperture and threadably mated thereto.

6. In a hole saw having a tubular cutting portion, a pilot drill bit, an ejection structure disposed within the tubular cutting portion, the ejection structure including a compression spring, the improvement wherein the ejection structure comprises:
   a) an annular plate disposed within the cutting portion and located adjacent to the compression spring;
   b) a cylindrical tube attached to the plate, the cylindrical tube receiving the drill bit; and
   c) a guide pin extending from the cylindrical tube and directed toward a central axis of the hole saw, the guide pin in sliding engagement with a flute of the drill bit.

7. The improvement of claim 6 further comprising at least one gripping projection located on the annular plate and directed outwardly from an exteriorly facing surface of the plate.

8. The improvement of claim 6 further comprising:
   a) a first set screw sized and shaped for abutting against a surface of the drill bit, the first set screw fixing the cutting portion with respect to the pilot drill bit for rotation of both the cutting portion and the drill bit about the central axis when the first set screw is frictionally engaged with the drill bit;
   b) a groove formed in the drill bit, the groove extending about the central axis; and
   c) a second set screw slidingly engageable with the groove, the second set screw fixing the pilot drill bit in an axial position with respect to the cutting portion when engaged with the groove, the second set screw allowing relative rotation of the drill bit with respect to the cutting portion when the first set screw is disengaged from the pilot drill bit.

9. A hole saw comprising:
   a) a tubular cutting portion having cutting teeth;
   b) a pilot drill bit having a cutting edge, a fluted body and a shank, the drill bit coaxial with the tubular cutting portion;
   c) a plunger disposed within the tubular cutting portion;
   d) a compression spring disposed within the tubular cutting portion and in contact with the plunger; and
   e) a guide pin attached to the plunger and in sliding engagement with the drill bit fluted body.

10. The hole saw of claim 9 wherein the plunger further comprises:
   a) an annular plate in contact with the compression spring; and
   b) a cylindrical tube attached to the plate, the cylindrical tube receiving the drill bit, the compression spring extending about the cylindrical tube, the guide pin extending from the cylindrical tube and directed toward a central axis of the hole saw.

11. The hole saw of claim 9 wherein the compression spring is conical.

12. The hole saw of claim 9 further comprising at least one gripping projection located on the plunger and directed outwardly from an exteriorly facing surface of the plunger.

13. The hole saw of claim 12 comprising a plurality of spaced gripping projections.

14. The hole saw of claim 9 further comprising:
   a) a first set screw sized and shaped for abutting against a surface of the drill bit, the first set screw fixing the cutting portion with respect to the pilot drill bit for rotation of both the cutting portion and the drill bit about the central axis when the first set screw is frictionally engaged with the drill bit;
   b) a groove formed in the drill bit, the groove extending about the central axis; and
   c) a second set screw slidingly engageable with the groove, the second set screw fixing the pilot drill bit in an axial position with respect to the cutting portion when engaged with the groove, the second set screw allowing relative rotation of the drill bit with respect to the cutting portion when the first set screw is disengaged from the pilot drill bit.

* * * * *